US006411195B1

(12) United States Patent
Goldman

(10) Patent No.: US 6,411,195 B1
(45) Date of Patent: Jun. 25, 2002

(54) DATA TRANSMISSION SYSTEM AND COMPONENTS THEREOF

(76) Inventor: Ilan Goldman, 3 Hayasmin St., Herzeliya 46631 (IL)

( * ) Notice: Subject to any disclaimer, the term of this patent is extended or adjusted under 35 U.S.C. 154(b) by 0 days.

(21) Appl. No.: 09/035,963

(22) Filed: Mar. 6, 1998

(30) Foreign Application Priority Data

Mar. 7, 1997 (IL) ................................................ 120393
May 30, 1997 (IL) ................................................ 120957

(51) Int. Cl.[7] .................................................. G06F 7/04
(52) U.S. Cl. ..................... 340/5.1; 340/543; 340/407.1; 340/5.2; 340/5.67; 340/5.7; 70/278.1
(58) Field of Search ............................ 340/543, 825.31, 340/407.1; 361/172, 160, 166, 169.1, 171; 341/176, 27, 34; 342/32; 70/278.1

(56) References Cited

U.S. PATENT DOCUMENTS 4,197,524 A * 4/1980 Salem ................... 340/825.31
4,780,856 A 10/1988 Becquey ...................... 367/23

FOREIGN PATENT DOCUMENTS

DE 19615932 C1 9/1997
EP 0261768 A2 3/1988

* cited by examiner

*Primary Examiner*—Michael Horabik
*Assistant Examiner*—William Bangachon

(57) ABSTRACT

A data transmission system (1) suitable for use with an impact transmissive body (4) and including a data transmitting device (6) having a reciprocable impact impeller head (3) for transmitting an encoded series of discrete mechanical impacts to a first surface of the impact transmissive body and a data receiving device (5) having an impact sensitive transducer (2) at a second surface of the impact transmissive body substantially opposite to its first surface for picking up vibrations resultant of the series of impacts.

23 Claims, 6 Drawing Sheets

DATA TRANSMISSION SYSTEM AND COMPONENTS THEREOF

FIELD OF THE INVENTION

The invention relates to data transmission systems in general and to impact responsive access control systems in particular.

BACKGROUND OF THE INVENTION

In U.S. Pat. No. 4,197,524 to Salem, there is illustrated and described a tap actuated lock for installing on a door's inside surface which is opened when an access combination is tapped on its outside surface. The taps are detected by an impact sensitive device which produces a sensible output in response to an impact. A typical access combination is a four-number code, for example, 4,3,2,5 which requires the tapping of a first set of four taps, a relatively long pause, the tapping of a second set of three taps, a second relatively long pause, the tapping of a third set of two taps, a third relatively long pause and finally the tapping of a fourth and last set of five taps. Such a procedure takes a relatively long time, in fact, anywhere between about 10 to 20 seconds and renders the access combination relatively insecure.

SUMMARY OF THE INVENTION

In accordance with the present invention, there is provided a data transmission system suitable for use with an impact transmissive body and comprising:

(a) a data transmitting device having a reciprocable impact impeller head for transmitting an encoded series of discrete mechanical impacts to a first surface of an impact transmissive body; and (b) a data receiving device having an impact sensitive transducer at a second surface of the impact transmissive body substantially opposite to its first surface for picking up vibrations resultant of said series of impacts.

A data transmission system of the present invention is suitable for a wide range of both unidirectional data transmission applications, for example, transmitting readings constituting data from a sensor or a detector to data collection equipment, transmitting control signals constituting data to actuable components, for example, a solenoid, a motor, a valve and the like and bidirectional data transmission applications. Thus, envisaged applications include, but are not limited to, those in respect of which conventional wired and remote control data transmission systems may be not convenient to install or suitable to operate, for example, transmitting data respectively through and across the walls of a sealed or pressurized container or a reinforced concrete wall.

In a data transmission system of the present invention, data is preferably encoded as the time intervals between consecutive impacts thereby defining an "average impact baud rate", namely, the average number of impacts per second. For example, in the case of a solenoid driven impeller head whose minimum and maximum time intervals between consecutive impacts is 30 msec and 100 msec, respectively, and the minimum time interval increment between consecutive impacts is about 1 msec, there are 70 distinguishable intervals each of which can represent an instruction code, a data reading, and the like. With such a solenoid driven impeller head, the average impact baud rate is about 20 impacts per second, however, it is envisaged an average impact baud rate of a data transmission system of the present invention can be considerably increased.

A data transmission system of the present invention is particularly suitable for implementation in access control applications, for example, to open a mortise lock, to open a bank safe, to obtain entry into a computerized communication and control network e.g. at an automatic teller machine (ATM) and the like. In such applications, a data transmitting device effectively constitutes an electronically controlled key for typically impacting a single encoded series of impacts, namely, an access combination. In these and other applications, an encoded series of impacts includes, for example, a four interval access combination of 30, 45, 55 and 62 msec which can be transmitted in less than a quarter of a second and is one of a total of $70^4$ (i.e. more than 25 million) combinations.

BRIEF DESCRIPTION OF THE DRAWINGS

For a better understanding of the invention and to show how the same may be carried out in practice, by way of non-limiting examples, reference will now be made to the accompanying drawings, in which.

DETAILED DESCRIPTION OF THE PREFERRED EMBODIMENTS

Figure 1:
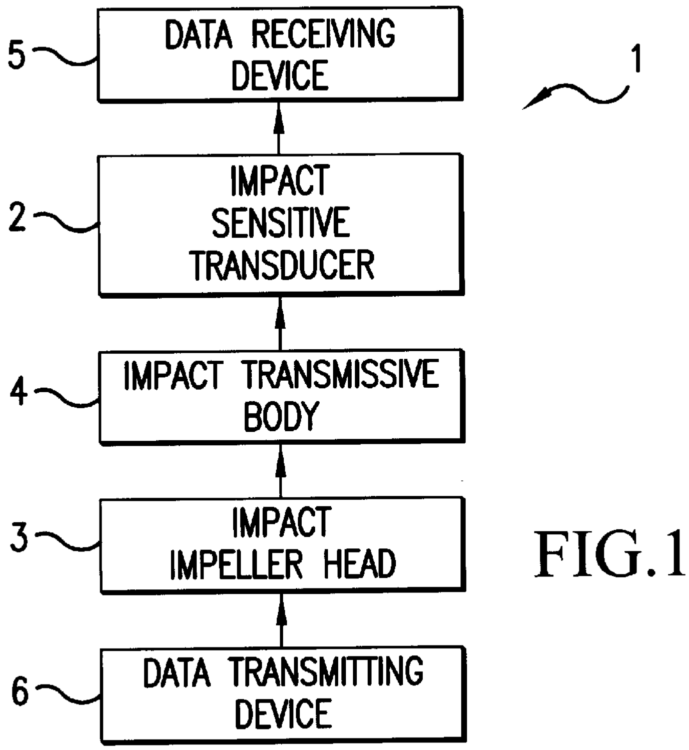
FIG. 1 is a schematic block diagram of a data transmission system of the present invention.

With reference now to the drawings, FIG. 1 shows a data transmission system 1 including an impact sensitive transducer 2 for sensing vibrations resultant of impacts from an impact impeller head 3 transmitted trough an impact transmissive body 4 interdisposed therebetween, the impact sensitive transducer 2 being associated with a data receiving device 5 and the impact impeller head 3 being associated with a data transmitting device 6.

Figure 2:
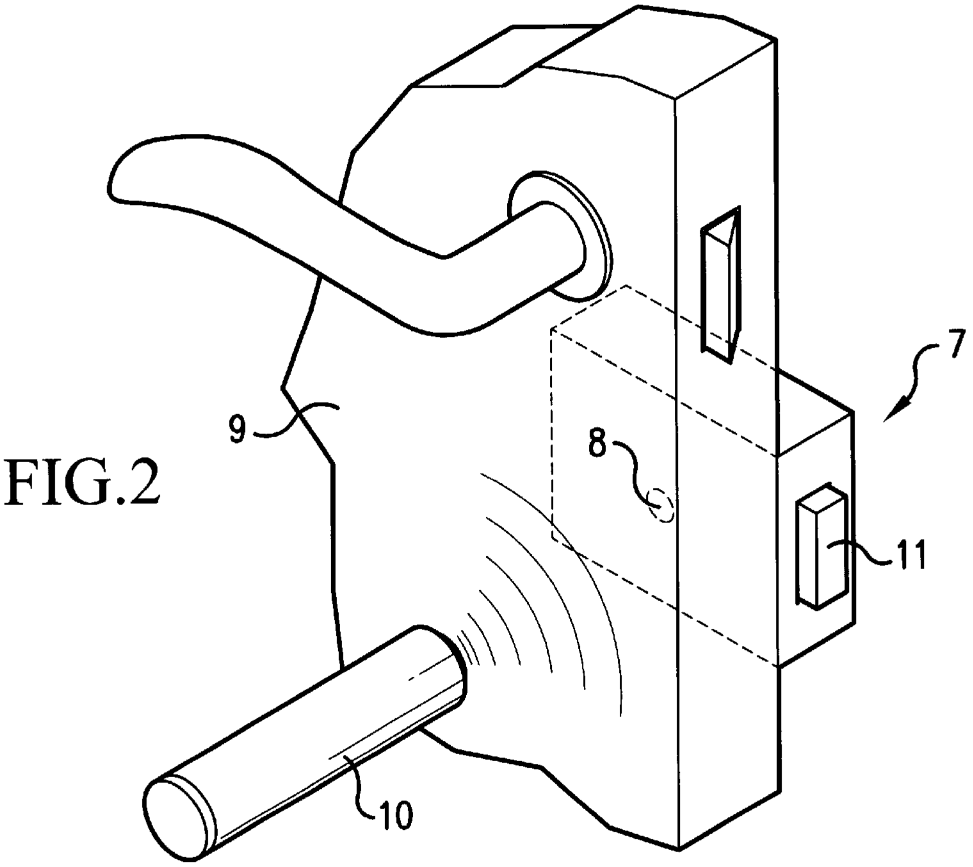
FIG. 2 is a pictorial representation of an access control system including an electronic mortise lock and a hand-held, pen-like electronic key.

Turning now to FIG. 2, there is shown an electronic mortise lock 7 including a data receiving device (not shown) coupled to a microphone 8 adapted for intimate juxtaposition against the inside surface of a solid door 9. The door may be opened by a hand-held, pen-like electronic key 10 constituting a data transmitting device.

In operation, the microphone 8 picks up vibrations at the door's inside surface which are the result of the impacts against the door's outside surface from the electronic key 10. The vibrations are suitably processed and then compared to an access combination for selectively operating a motor or solenoid (not shown) to drive a dead bolt 11 between a locking operative position and an unlocking operative position when the encoded series of impacts matches the access combination.

Figure 3:
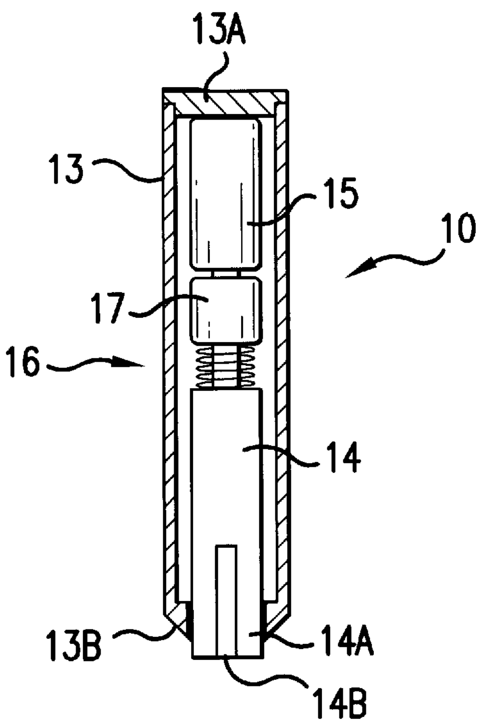
FIGS. 3 and 4 are respectively a cross sectional view and a block diagram of the electronic key of FIG. 2.
Figure 4:
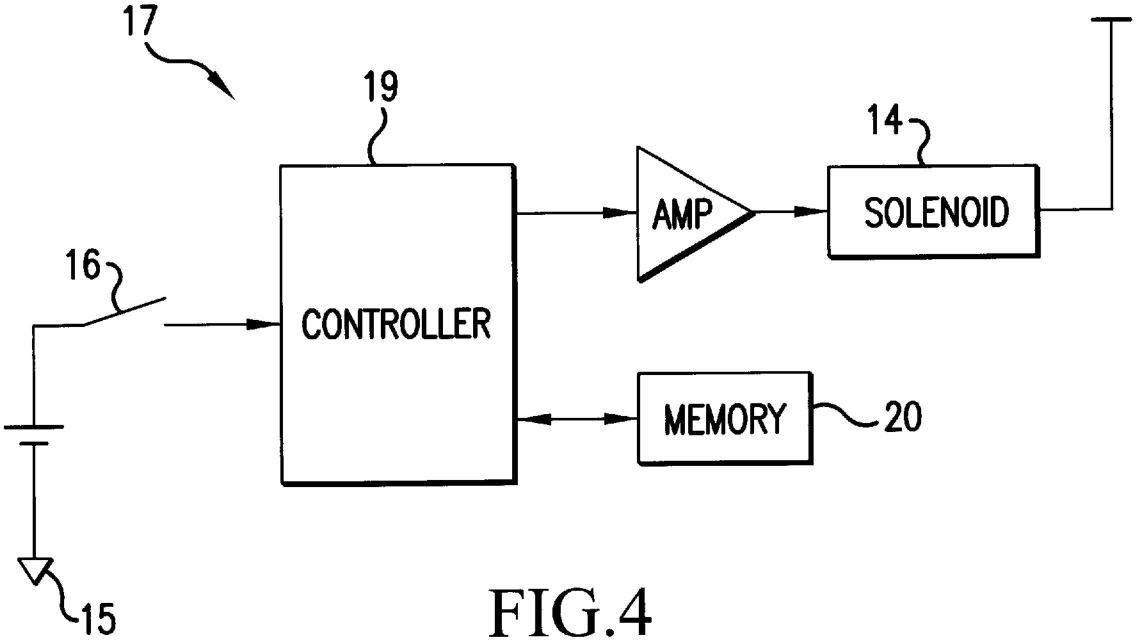

As shown in FIGS. 3 and 4, the electronic key 10 includes a tubular housing 13 with a closed rear end 13A and an open front end 13B from which extends a tubular leading portion 14A of an electromagnetic device 14, e.g. a push-type solenoid, having a reciprocable pneumatic hammer type impeller head 14B. Interdisposed between the rear end 13A and the push-type solenoid 14 is a battery 15 and a normally open spring biased switch 16 which is closed on depressing the tubular leading portion 14A at key 10 against an impact receiving surface i.e. a door. On closing the switch 16, power is provided to electronic circuitry 17 including a controller 19 for activating the solenoid 14 in accordance with a predetermined code stored in a memory 20.

Figure 5:
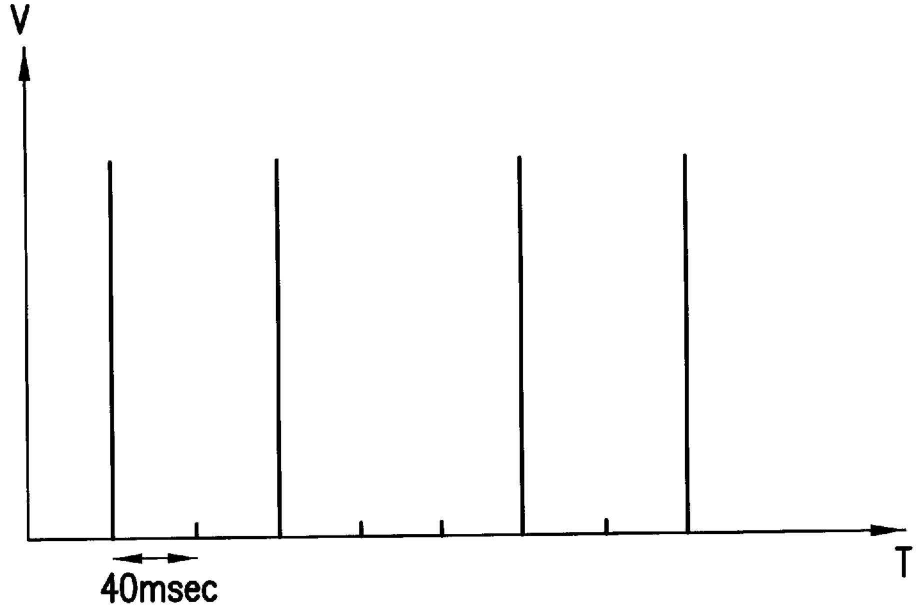
FIGS. 5 and 6 are graphical representations of different types of encoded series of discrete mechanical impacts.
Figure 6:
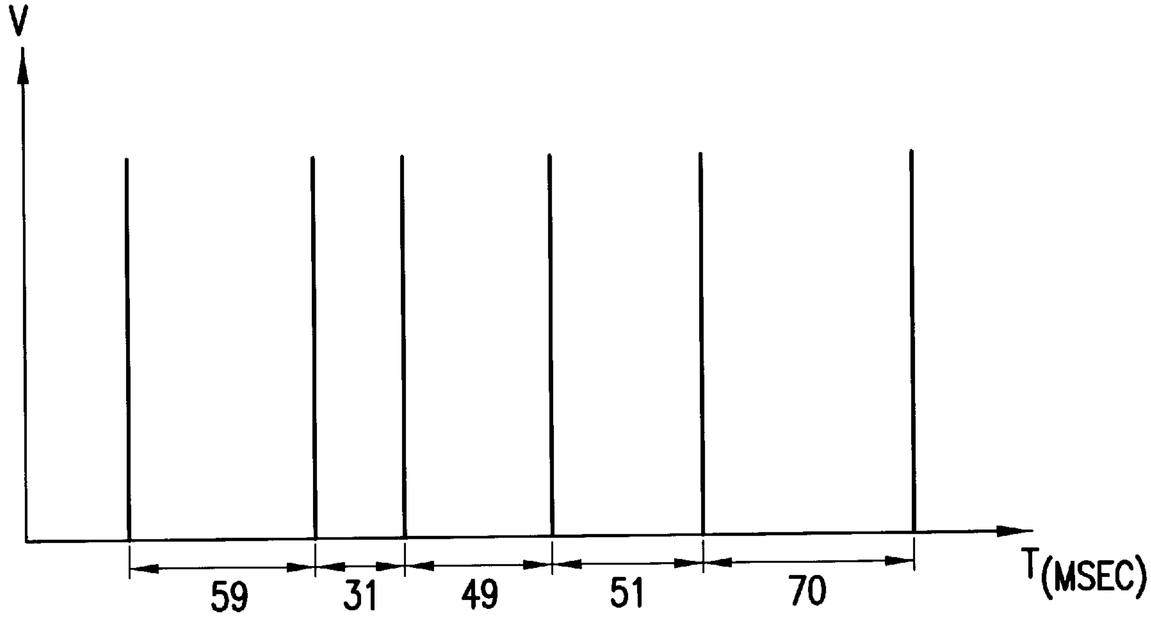

The key 10 is designed to impact an encoded series of impulse-like, high energy impacts as a function of the presence of absence of impacts at a predetermined impact rate (see FIG. 5) or time intervals between consecutive impacts (see FIG. 6). For example, FIG. 5 shows an access combination 10100101 where 1 is representative of the presence of an impact and 0 is representative of the absence of an impact whilst FIG. 6 shows an access combination 59, 31, 49, 51, and 70 msec corresponding to the time intervals between consecutive impacts.

Figure 7:
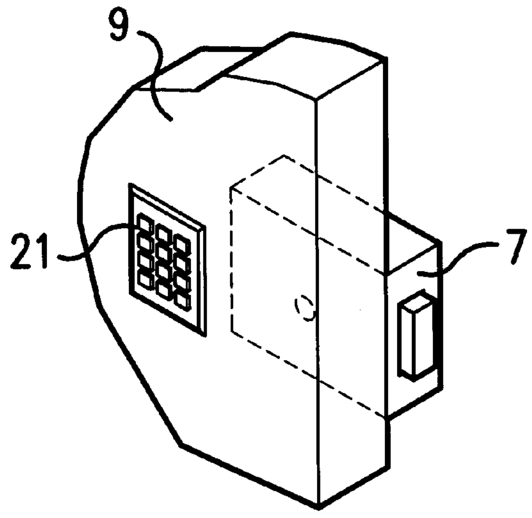
FIGS. 7 and 8 are pictorial representations of the electronic mortise lock of FIG. 2 and a data transmitting device respectively activated by a touch keypad and a remote control.
Figure 8:
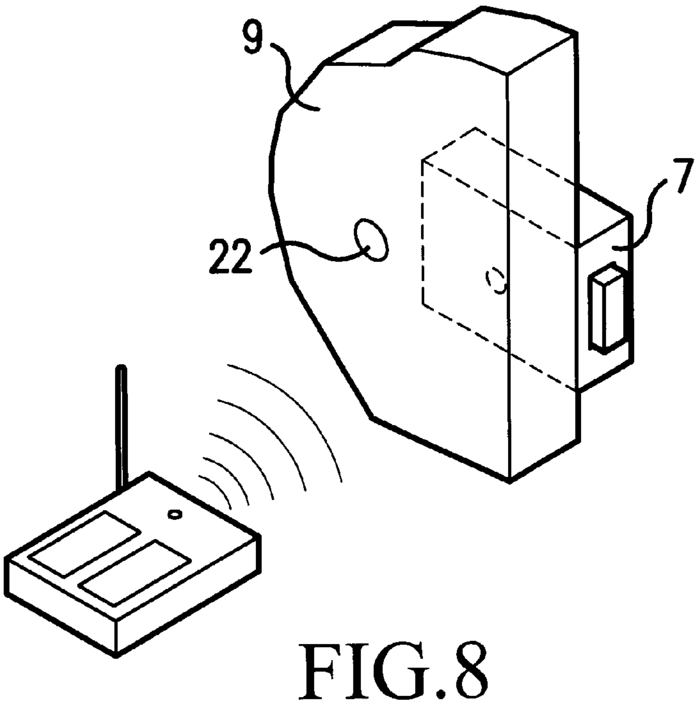
Figure 9:
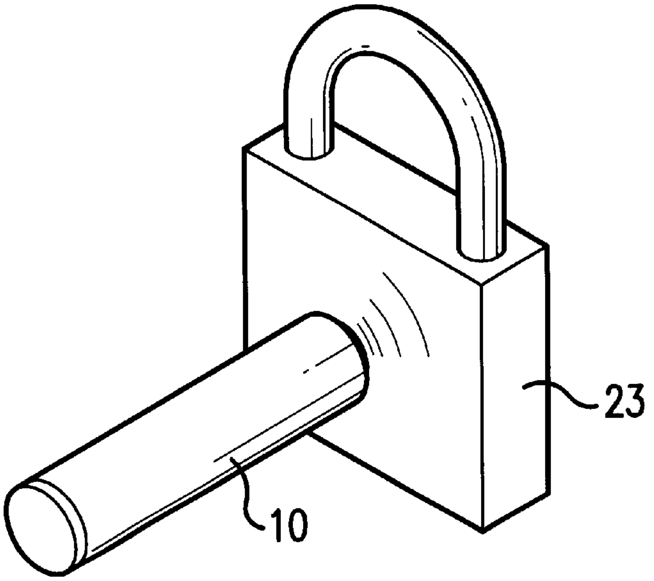
FIG. 9 is a pictorial representation of an electronic combination padlock and the hand-held, pen-like electronic key of FIG. 2.

FIG. 7 shows the electronic mortise lock 7 opened by a data transmitting device 21 including an impact impeller head activated by a touch keypad. FIG. 8 shows the electronic mortise lock 7 opened by a data transmitting device 22 including an impact impeller device activated by remote control. FIG. 9 shows an electronic combination padlock 23 opened by the electronic key 10.

Figure 10:
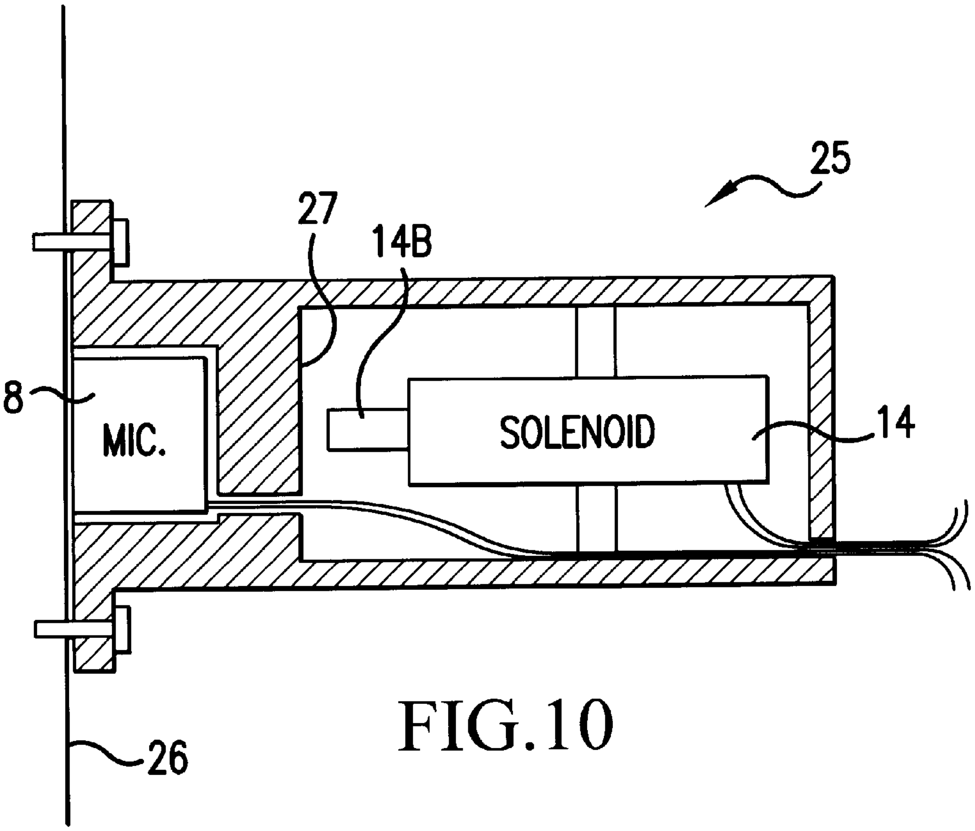
FIG. 10 is a cross sectional view of a data transmitting/receiving device.

For use in bidirectional data transmitting systems, FIG. 10 shows a data transmitting/receiving device 25 including a push-type solenoid 14 and a microphone 8, the former having a reciprocable impeller head 14B for indirectly impacting against an impact transmissive body 26 via an interior wall 27 of the device.

Figure 11:
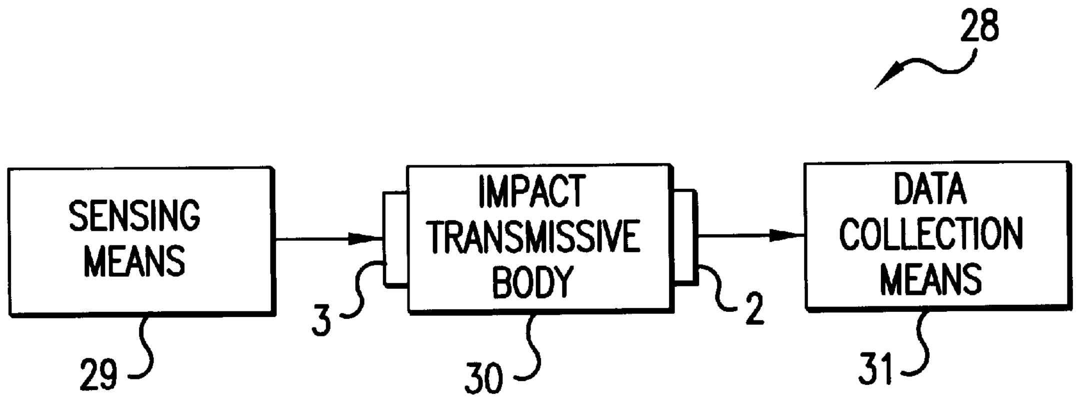
FIG. 11 is a block diagram of a data transmission system of the present invention for transmitting data from a sensing means to a data collection means.

FIG. 11 shows a data transmission system 28 for transmitting data from a sensing means 29 to a data collection means 31 via an impact impeller device 3 and an impact sensitive transducer 2 disposed on opposite sides of an impact transmissive body 30.

Figure 12:
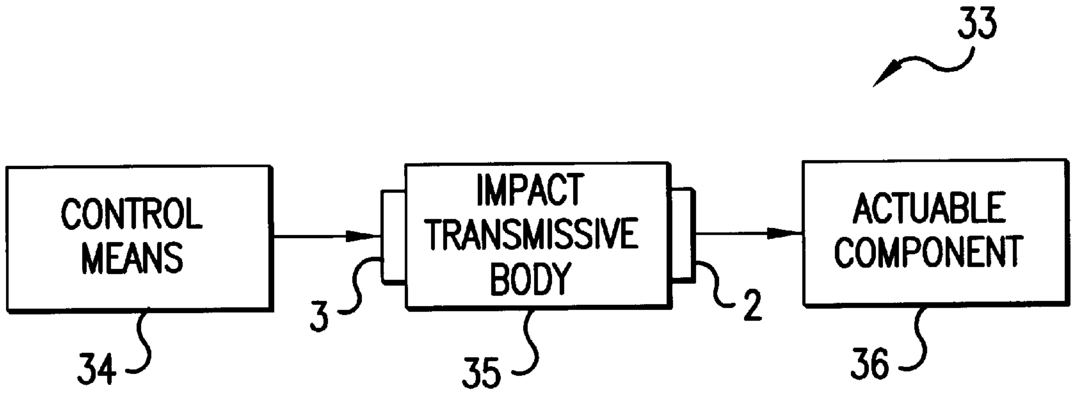
FIG. 12 is a block diagram of a data transmission system of the present invention for transmitting data from a control means to an actuable component.

FIG. 12 shows a block diagram of a data transmission system 33 for transmitting data from a control means 34 to an actuable component 36 via an impact impeller device 3 and an impact sensitive transducer 2 disposed on opposite sides of an impact transmissive body 35.

Figure 13:
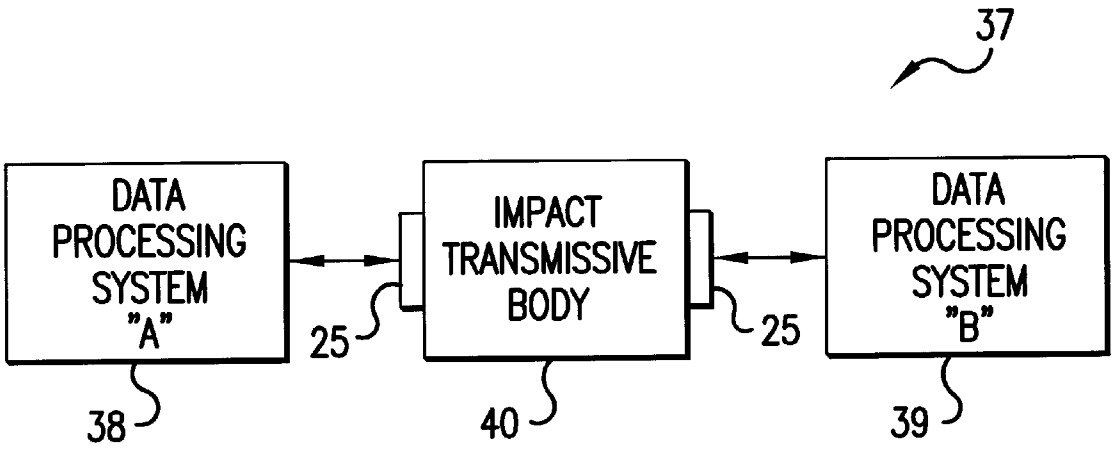
FIG. 13 is a block diagram of a data transmission system of the present invention for transmitting data between two data processing systems.

FIG. 13 shows a data transmission system 37 for transmitting data between a pair of data processing systems "A" and "B" 38 and 39 via a pair of transmitting/receiving devices 25 disposed on opposite sides of an impact transmissive body 40.

While the invention has been described with respect to a limited number of embodiments, it will be appreciated that many variations, modifications and other applications of the invention may be made. For example, instead of a microphone, an impact sensitive transducer can be implemented by a piezoelectric device, and the like. Data transmission can be encrypted in accordance with conventional data encryption standards. In addition, for example, in control access applications where access combinations are necessarily matching, they can be periodically updated using conventional algorithm based combination generators hitherto incorporated in vehicle security systems, burglar systems and the like.

What is claimed is:

1. A system for data transmission through an impact transmissive body, said system comprising:

(a) a data transmitting device having a reciprocal impact impeller head for transmitting an encoded series of discrete mechanical impacts to a first surface of the impact transmissive body; and (b) a data receiving device having an impact sensitive transducer at a second surface of the impact transmissive body substantially opposite to the first surface for picking up vibrations resultant of said series of impacts.

2. The system according to claim 1, wherein a series of impacts is encoded as a function of the time intervals between consecutive impacts.

3. The system according to claim 1, wherein a series of impacts is encoded as a function of the presence or absence of impacts at a predetermined impact rate.

4. A system according to claim 1, wherein said data transmitting device is a key of a lock and key combination and said data receiving device forms a portion of a lock of the lock and key combination, and said series of impacts is a coded combination for controlling said lock.

5. The system according to claim 4, wherein the key is adapted to transmit a coded combination of impacts for controlling said lock.

6. The system according to claim 5, wherein the system is configured to be hand-held.

7. The system according to claim 6, wherein the system is activated on being pressed against an impact transmissive body.

8. The system according to claim 4, wherein the impact sensitive transducer is adapted to receive a coded combination of impulses from the impact transmissive body through which said impulses are transmitted, and the received impulses are at a baud rate greater than 20 impacts per second.

9. A system according to claim 1, wherein said data transmitting device is associated with a sensing device, said data receiving device is associated with a data collector, and said series of impacts encodes a sensed value or quality.

10. A system according to claim 1, wherein said data transmitting device is associated with a controller and said data receiving device is associated with a series of impacts, which encode a control signal.

11. A system according to claim 1, wherein the system is an access control system, and said data transmitting device is adapted to transmit to the impact transmissive body a coded access controlling code encoded in a specific series of impacts and said data receiving device forms part of an access control module, permitting access upon receipt of said specific series of impacts.

12. A data transmitting device comprising:

a reciprocable impact impeller head for transmitting a data-encoding series of discrete mechanical impacts to a surface of an impact transmissive body through which said data-encoding series is further transmitted;

a controller for activating the impeller head according to a predetermined code;

a switch electrically connected to a power source and the controller and for providing power to the controller when the switch is in a closed position.

13. The device according to claim 12, wherein the device is configured to be hand-held.

14. The device according to claim 13, wherein the device is activated on its being pressed against an impact transmissive body.

15. The device according to claim 12, wherein the device is activated by an integrally formed user interface.

16. The device according to claim 12, wherein the device is activated by a remote control user interface.

17. A data receiving device comprising:

an impact sensitive transducer for receiving a data-encoding series of impulses from an impact transmissive body through which said impulses are transmitted and responsive to an average impact baud rate of greater than 20 impulses per second.

18. A data transmitting/receiving device for use in a system associated in operation with an impact transmissive body through which the data is transmitted as an encoded series of discrete mechanical impulses, said device comprising:

a reciprocable impact impeller head adapted to transmit a data-encoding series of discrete mechanical impacts to a surface of the impact transmissive body and an impact sensitive transducer adapted to receive a data-encoding series of impulses from a surface of the impact transmissive body.

19. The device according to claim 18 wherein said impact impeller head indirectly impacts against an impact transmissive body.

20. A data transmission system suitable for use with an impact transmissive body and comprising:

an electronically-controlled data transmitting device having a reciprocal impact impeller head for applying discrete mechanical impacts to a first surface of an impact transmissive body to transmit to said body an encoded series of impulse mechanical impacts which are encoded as time intervals between successive impacts in said series; and a data receiving device having an impact sensitive transducer at a second surface of the impact transmissive body opposite to its first surface for picking up vibrations resultant of said series of impacts for subsequent decoding of said data.

21. A system for data transmission through an impact transmissive body, said system comprising:

(a) a data transmitting device having a reciprocal impact impeller head for transmitting an encoded series of discrete mechanical impacts to the impact transmissive body; and (b) a data receiving device having an impact sensitive transducer at a second surface of the impact transmissive body for picking up vibrations resultant of said series of impacts.

22. The system according to claim 21, wherein the series of impacts is encoded as a function of the time intervals between consecutive impacts.

23. A system according to claim 22, wherein the system is an access system, and said data transmitting device is adapted to transmit to the impact transmissive body a coded access controlling code encoded in a specific series of impacts and said data receiving device forms part of an access control module, permitting access upon receipt of said specific series of impacts.

* * * * *